United States Patent [19]

Brumer et al.

[11] Patent Number: 4,755,269

[45] Date of Patent: Jul. 5, 1988

[54] PHOTODISSOCIATION PROCESS

[75] Inventors: Paul Brumer, Willowdale, Canada; Moshe Shapiro, Rehovot, Israel

[73] Assignee: Univ. of Toronto Innovations Foundations, Ontario, Canada

[21] Appl. No.: 930,344

[22] Filed: Nov. 12, 1986

[30] Foreign Application Priority Data

Nov. 12, 1985 [CA] Canada ................................. 494993

[51] Int. Cl.[4] ............................................. B01J 19/08
[52] U.S. Cl. ............................ 204/157.4; 204/157.41; 204/157.6; 204/157.61
[58] Field of Search ............ 204/157.4, 157.41, 157.44, 204/157.6, 157.61, 157.15, 157.63, 157.2, 157.21, 157.22

[56] References Cited

U.S. PATENT DOCUMENTS 4,124,466 11/1978 Morrey ............................ 204/157.41

OTHER PUBLICATIONS

M. Shapiro, R. Bersohn; Theories of the Dynamics of Photodissociation; Ann. Rev. Phys. Chem., 1982; 33:409-42.
G. G. Balint-Kurti, M. Shapiro; Quantum Theory of Molecular Photo Dissociation; Photodissociation and Photoionization, edited by K. P. Lawley, 1985; pp. 403-450.
Paul Brumer, Moshe Shapiro; Theoretical Aspects of Photodissociation and Intramolecular Dynamics; Photodissociation and Photoionization, edited by K. P. Lawley, 1985; pp. 371-403.

Primary Examiner—John F. Niebling
Assistant Examiner—Ben C. Hsing
Attorney, Agent, or Firm—Ostrolenk, Faber, Gerb & Soffen

[57] ABSTRACT

Photodissociation of molecules in a known energy level is conducted by raising the molecules from that energy level to a predetermined energy level in the continuum above the dissociation energy of the molecule, along a plurality of different routes. Each route requires at least one frequency of coherent electromagnetic radiation. By simultaneous application of the coherent radiation pertaining to one route and the coherent radiation pertaining to another route, and variation of the relative phase and/or relative amplitude of the simultaneously applied radiations, control over the degree to which respective photodissociation pathways are adopted can be exercised, so as to control the relative amounts of different photodissociation products which can be formed.

19 Claims, 5 Drawing Sheets

PHOTODISSOCIATION PROCESS

FIELD OF THE INVENTION

This invention relates to processes of molecular photodissociation, and more particularly to methods and processes for controlling the relative yields of products, and product quantum state populations, resulting from molecular photodissociation processes.

BACKGROUND

The photodissociation of a molecule, upon absorption of photons of wavelength within the absorption spectrum of the molecule, can often lead to the formation of different sets of products, according to the dissociative chemical pathway adopted by the molecule. For successful industrial and commercial practice of such processes, the exercise of control over the dissociative pathway, so as to maximize the yield of desired product, becomes important. With the advent of laser radiation, with its highly specific radiation frequencies, it was believed that it would be possible to exercise control over photodissociation processes by using lasers of a specific frequency or energy carefully matched to bond breaking energies required for the photodissociation to follow a prescribed pathway to yield the desired product. In practice, however, it is found that such methods are of very limited success, one reason being that the laser energy which is supplied often dissipates rapidly throughout the target molecule, and does not concentrate in the specific bond or bonds which one wishes to break.

BRIEF REFERENCE TO THE PRIOR ART

Processes according to the prior art for photodissociation have merely irradiated the target molecule AB with radiation of energy hv sufficient to raise the molecules to the energy level at which the molecule photodissociates (hereinafter $E_B$) or above. This causes photodissociation of the molecule, but without control over the photodissociation pathway adopted and so without control over the yield of specific photodissociation products. For example, the molecule ABC may be capable of photodissociation along two different pathways to produce two different sets of products, thus:

Processes according to the prior art exercise no control over the adoption of pathway 1 or pathway 2, so that products A, B, C, AB and C are produced in uncontrolled relative quantities. For practical purposes, however, only product A may be useful. To maximise the yield of product A, control should be exercised to ensure that photodissociative pathway 1 is followed to the maximum extent.

SUMMARY OF THE INVENTION

It is an object of the present invention to provide a novel process of photodissociation.

It is a further object of the present invention to provide a process of photodissociation which can be controlled to allow for increased yield of one or more of the possible products of the photodissociation reaction.

The present invention provides a process whereby photodissociation of molecules initially in a known energy level $E_I$ is conducted. The molecules are raised from the level $E_I$ to a predetermined energy level E in the continuum above the dissociation energy $E_B$ of the molecule along a plurality of different independent routes, each route requiring at least one frequency of coherent electromagnetic radiation. An appropriate frequency of coherent radiation pertaining to one such energy route is applied simultaneously with an appropriate frequency of coherent radiation pertaining to at least one other such route. The relative phase and/or the relative amplitude of the simultaneously applied frequencies may be adjusted to control the degree to which respective photodissociation pathways are adopted.

By controlling the relative phases and amplitudes of the coherent electromagnetic radiations, control over the photodissociative pathways followed by the molecule, and therefore control over the relative yield of photodissociation products, can be obtained.

Also, the relative phase and/or relative amplitude of the respective electromagnetic radiations may be adjusted to control product quantum state populations. The resultant controlled product molecules, which may thus have de-populated quantum states, can then be used to produce chemical laser emissions as the deficient quantum state is re-populated. In some instances this produces laser emissions never previously obtained.

REFERENCE TO THE DRAWINGS

DESCRIPTION OF THE PREFERRED EMBODIMENTS

Figure 1:
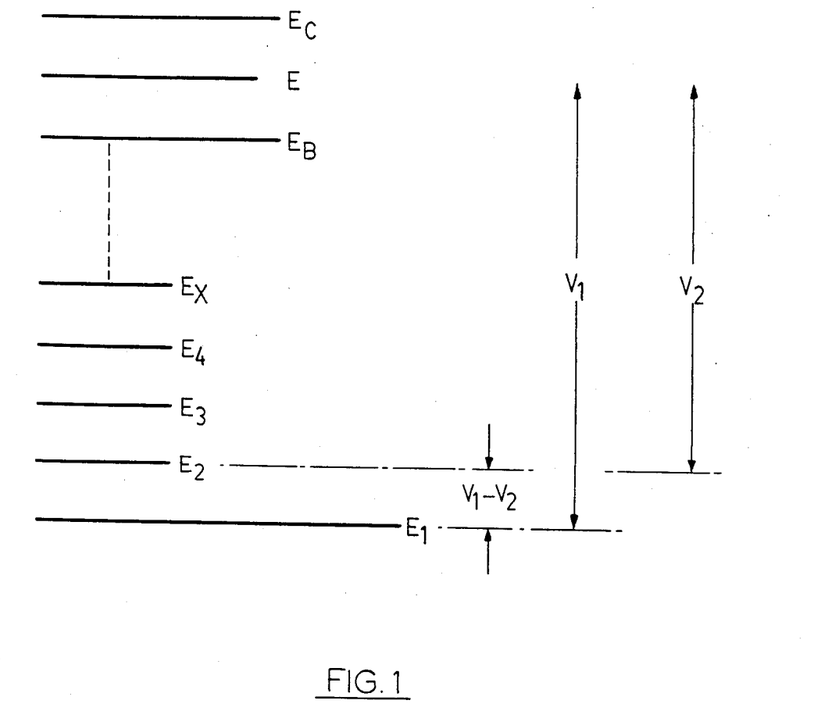
FIG. 1 is a diagrammatic representation of the molecular energy levels of any molecule denoted AB, capable of absorbing laser radiation of frequency $v_1$ and photodissociating under influence thereof.

With reference to FIG. 1 of the accompanying drawings, this diagrammatically illustrates a series of ascending discrete energy levels pertaining to the molecule, denoted AB. A molecule can have energy in translation modes, in rotation modes, in vibration modes and in electronic modes. The total number of possible such modes depends upon the number of atoms in the molecule, among other factors. Under conditions under which the radiative processes of the present invention are conducted, the translational modes (which are not quantized) are irrelevant, so that any energy supplied to the molecule will enter into one or more of the remaining internal molecular modes, which are quantized. Thus the energy of the molecule can be raised by discrete amounts, from level $E_1$ to level $E_2$, then to $E_3$ etc. These discrete energy levels, namely the "Bound State Energy Levels", form an identifiable fingerprint of a molecule. The energy levels of very many molecules have been studied and reported in the scientific literature, and numerical values thereof have been published and are available from reference works (eg. Gerhard Hertzberg, "Electronic Spectra of Polyatomic Molecules" and similar works). They are expressed as atomic units of energy, or following Einstein's equation relating energy to frequency ($E=h\nu$, where h is Planck's constant and $\nu$ is frequency), as frequencies or wave numbers.

Eventually, as more and more energy is supplied to the system, one reaches an energy level $E_B$ at which the molecule photodissociates. Above $E_B$ are various energy levels E at which the molecule has dissociated into its component particles which have free movement, translational motion etc. Energy levels such as E can have any value and are referred to as being in the continuum.

The process of the present invention allows control to be exercised over the photodissociation pathway which a molecule follows on photodissociation, where more than one such pathway is available. Thus, control and maximization of desired photodissociation products can be exercised. This is accomplished by providing the molecule with energy of radiation of frequencies appropriate for dissociation by more than one different independent routes. Each route requires at least one frequency of electromagnetic radiation (e.g. laser irradiation). At least one frequency of radiation of one route is applied simultaneously with at least one frequency of radiation of another route. Variation of relative amplitude and/or phase of the two simultaneously applied radiations permits this control.

In one embodiment of the process of the present invention, two different energies or frequencies of radiation are chosen, related to the known bound state energy levels of the molecule. Firstly, referring to FIG. 1, the operator chooses frequency $v_1$ which is required to raise the molecule from its ground energy state $E_1$ to a predetermined, fixed energy level E in the continuum, ie above the dissociation energy level $E_B$. Next, the operator chooses a raised energy level $E_2$, $E_3$, $E_x$ etc. from among the bound state energy levels, and calculates the frequency $v_2$ required to raise the molecule from the chosen raised energy level (for example $E_2$ as shown as FIG. 1) to the previously determined level E in the continuum. The operator then reduces the target molecules to a state primarily comprised of molecules in their ground state $E_1$, eg by cooling, passing through supersonic nozzles for adiabatic expansion etc., and irradiates the molecules in two or more stages with combinations of $v_1$ and $v_2$ frequencies of photon radiation.

For example, the first stage irradiation might be with a laser of energy $h(v_1-v_2)$, obtained by crossing the $v_1$ and $v_2$ laser, with the result that the molecules are raised from the ground state $E_1$ to a superposition state $E_2/E_1$. In such a superposition state, as is well understood in quantum mechanics, the molecules individually can be expressed as having a certain "probability" of being in state $E_1$ or state $E_2$, as opposed to a mixed state in which each individual molecule is definitely in one or other of states $E_1$ or $E_2$.

Then, in the next stage of irradiation, the operator simultaneously applies to the molecules in superposition state $E_2/E_1$, laser radiations of frequencies $v_1$ and $v_2$, thereby creating a superposition state E of the molecule, at which time they dissociate. Exercise of control over the relative amplitudes and relative phases of the two simultaneously applied lasers $v_1$ and $v_2$ controls the relative number of molecules adopting one or other of the possible photo-dissociative pathways, and hence the relative yields of photodissociation products. It will of course be appreciated that the second chosen state need not necessarily be the adjacent level $E_2$ but can be any of the bound state energy levels.

The radiative procedure does not need to be conducted in two separate, successive steps. In a preferred embodiment of the present invention, the frequency of the second laser $v_2$ is half that of the first laser $v_1$. Simultaneous irradiation is then performed with laser $v_1$ and $v_2$, to create a superposition state in the continuum. Phase and amplitude control over lasers $v_1$ and $v_2$ is used to control the relative yields of photodissociation products. Frequency doubling of lasers is relatively simple, in practice.

In a further alternative, the initial laser radiation may correspond to a continuum energy level $E_c$ for the molecule which is higher than $E_B$. Following such initial radiation, the molecule may be forced down to level E by stimulated emission using radiation of frequency $(E_c-E_B)/h$ while simultaneously irradiating with frequency $v_l$.

The essential features of each of these alternatives is the creation of a superposition state in the continuum, control over the composition of which, as between the various possible products of dissociation, can be exercised by relative amplitude and phase control of the simultaneously applied lasers. Control over a single preselected quantum state can also be controlled by relative amplitude and phase control of the simultaneously applied lasers.

The irradiations in the process of the present invention are preferably but not necessarily conducted in environments in which inter-molecular collisions are not a significant factor, eg. low pressure environments. In such cases, the results of the process, and the control which can be exercised over the product yields, are not complicated by molecular collisions. photodissociation in practice can take place on a time scale of the order of $10^{-7}-10^{-12}$ seconds, and so the preferred practical conditions are those which substantially eliminate inter-molecular collisions on this time scale. Indeed, in general, this is readily achievable using currently available vacuum technology. Also, as noted above, initially the target molecules may be reduced to the ground energy state, which can be achieved by use of low temperatures or by supersonic nozzle expansions. The process can also be conducted with the molecules above the ground energy state although the degree of control of the product distribution will most likely be lower than if the molecules are initially in the ground energy state.

Whilst the preferred form of coherent radiation for use in the present invention is laser radiation, the process is not limited thereto. Any other suitable form of coherent radiation, ie. radiation of precisely known and controllable frequency, phase and amplitude, e.g. microwave, infra-red, ultraviolet etc may be used, as required by the known energy levels.

A typical nozzle cooling environment consists of blowing molecules through a nozzle with a 150 mm pinhole and with backing pressure of 35 psi of rare gas. Ambient preserve in the expansion chamber of the nozzle is maintained at $10^{-4}$ torr and nozzle temperature is maintained at temperatures well above the molecules boiling point.

The theoretical underlying principles upon which the present invention is based are presented below.

PHOTODISSOCIATION FROM A SUPERPOSITION STATE

A. General Formulation consider a molecule with Hamiltonian $H_m$ subject to the following radiation field, which begins to affect the molecule at $t=0$:

$$\epsilon(t) = \int dw\, \epsilon(w) \cos(wt + \phi_w) \quad (1)$$

Here $\epsilon(w)$ denotes the electric field at frequency $w$. Assuming a dipole interaction, the total Hamiltonian is:

$$H = H_m - \mu \int dw\, \epsilon(w) \cos(wt + \phi_w) \quad (2)$$

where $\mu$ is the component of the dipole in the direction of the electric field. If the molecule is initially ($t=0$) in a single bound molecular eigenstate $|E_i\rangle$ at energy $E_i$, then traditional photodissociation ensues. Consider, however, the dynamics which results when the molecule is previously prepared in a superposition of nondegenerate bound states given by $|X(t=0)\rangle = \Sigma_j c_j |E_j\rangle$. Modifying the standard photodissociation formalism[1,2] to account for this case proceeds as follows. First, the total system wavefunction is expanded in the bound and continuum molecular eigenstates as:

$$|\psi(t)\rangle = |X(t)\rangle + \Sigma_{n,q} \int dE\, B(E,\underline{n}q/t) |E,n,q^-\rangle \quad (3)$$

where $|X(t)\rangle = \Sigma_j c_j |E_j\rangle \exp(-iE_jt/\hbar)$. Here $|E,n,q^-\rangle$ is the continuum state which correlates with the asymptotic product state $|E,n,q^o\rangle$ consisting of products in arrangement channel $q$ ($q=1, 2, \ldots$) and internal quantum states labeled by $\underline{n}$. The principal quantity of interest herein is the probability of decay into final arrangement channel $q$, given, to within an overall normalization factor, by:

$$P(q;E) = \Sigma_{\underline{n}} |B(E,n,q|\infty)|^2. \quad (4)$$

Substituting Eq. (3) into the time dependent Schrodinger equation and adopting the standard use of first order perturbation theory and the rotating wave approximation[1,2] gives:

$$B(E,n,q/t) = (i/2\hbar) \int dw\, \tilde{\epsilon}(w) \int dt'\, \langle E,n,q^-|\mu|X(t')\rangle \exp\{it'(E/\hbar - w)\} \quad (5)$$

with $\tilde{\epsilon}(w) = E(w)\exp(-i\phi_w)$. Introducing the explicit form of $X^{(+)}$ we obtain:

$$B(E,\underline{n},q/t) = (i/2\hbar)\Sigma_j c_j \langle E,\underline{n},q^-|\mu|\tilde{E}_j\rangle \int dw\, \tilde{\epsilon}(w) \int dt'\, \exp\{-i(wE_j - w)t'\} \quad (6)$$

where $w_{Ej} = (E - E_j)/\hbar$. For $t$ sufficiently large the time integral reduces to a delta function giving:

$$B(E,n,q/\infty) = (\pi i/\hbar)\Sigma_j c_j \langle E,n,q^-|\mu|\tilde{E}_j\rangle \epsilon(w_{Ej}) \quad (7)$$

with $$P(q;E) = (\pi/\hbar)^2 \Sigma_{\underline{n}} |\Sigma_j c_j \tilde{E}(w_{Ej}) \langle E,n,q^-|\mu|E_j\rangle|^2.$$

Expanding the square allows the more convenient form:

$$P(q;E) = \Sigma_{i,j} F_{i,j} \mu_{i,j}^{(q)} \quad (9)$$

with $$F_{i,j} = c_i \tilde{\epsilon}(w_{Ei}) c_j^* \tilde{\epsilon}^*(W_{Ej})$$

$$\mu_{i,j}^{(q)} = \Sigma_n \langle E_j|\mu|E,\underline{n},q^-\rangle \langle E,\underline{n},q^-|\mu|E_i\rangle \quad (10)$$

Here $\mu(q)$ contains only molecular attributes whereas $F_{i,j}$ contains all aspects of the preparation including the magnitudes and phases of the electric field and initially prepared coherent state $|X(0)\rangle$. Experimental control over these parameters allows manipulation of the magnitude of $P(q;E)$. In particular, variation of the magnitudes and phases of $F_{i,j}$, through the $c_j$ and the fields, allows one to maximize or minimize a selected final product channel. The case of two product arrangement channels ($q=1,2$) is discussed below.

B. Two Product Arrangement Channels

Figure 2:
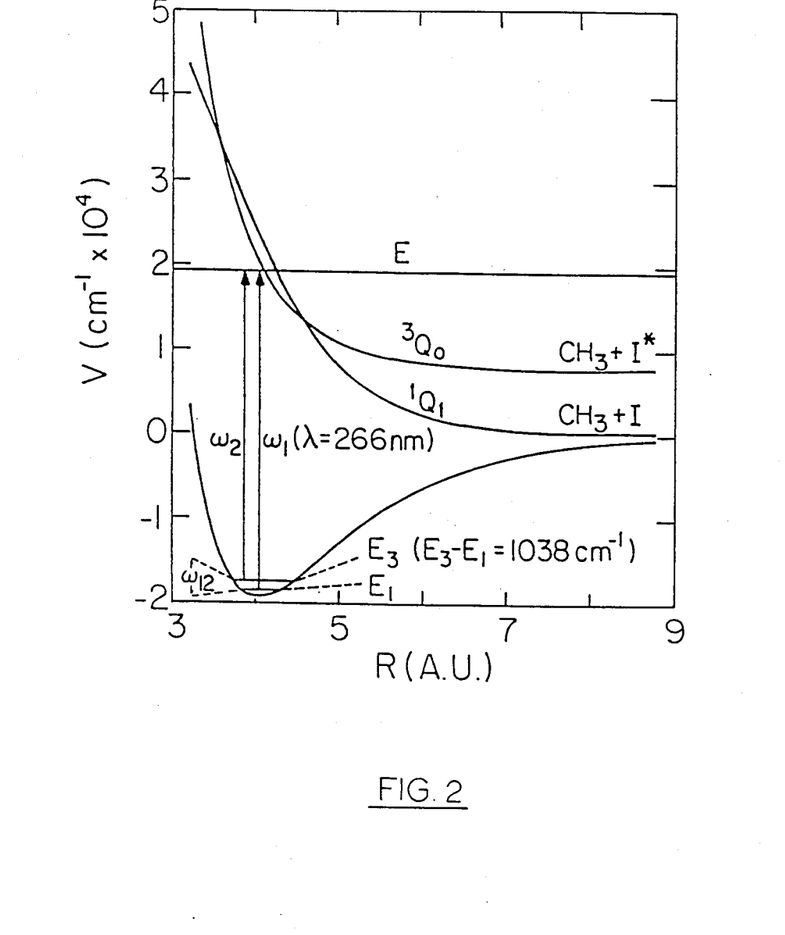
FIG. 2 represents cuts through the potential energy surfaces for the ground and excited states of methyl iodide (see example 1 and reference 3)

As an explicit example we consider a case, depicted in FIG. 2, in which two product channels are accessible at energy $E$ and the prepared initial superposition state is a combination of only two states, denoted $|E_1\rangle$ and $|E_2\rangle$. In addition, $E(w)$ is now comprised of two sharp lines at frequencies $w_1 = (E - E_1)/\hbar$ and $w_2 = (E - E_2)/\hbar$. In this arrangement one first uses, for example, a laser or a microwave pulse at $w_{12} = w_1 - w_2$ to excite a ground level $|E_1\rangle$ and $|E_2\rangle$, thus forming a superposition state of $|E_1\rangle$ and $|E_2\rangle$. One then follows by irradiating the sample with two coherent beams at $w_1$ and $w_2$. Equation (9) then consists of four terms and the ratio of product yields in the two channels is conveniently written as:

$$R(1:2;E) = P(q=1;E)/P(q=2;E) = \quad (11)$$

$$\frac{\{|\mu_{1,1}^{(1)}| + x^i|\mu_{2,2}^{(1)}| + 2x \cdot \cos(\theta_1 - \theta_2 + \alpha_{1,2}^{(1)})|\mu_{1,2}^{(1)}|\}}{\{|\mu_{1,1}^{(2)}| + x^2|\mu_{2,2}^{(2)}| + 2x \cdot \cos(\theta_1 - \theta_2 + \alpha_{1,2}^{(2)})|\mu_{1,2}^{(2)}|\}}$$

where the following notation has been adopted:

$$f_j \exp(i\theta_j) = \tilde{\epsilon}(wE_j)c_j;$$

$$\mu_{i,j}^{(q)} = |\mu_{i,j}^{(q)}| \exp(i\alpha_{i,j}^{(q)}); \quad x = |f_2/f_1|$$

The external control parameters are now $\theta_i$ and $x$, which are the combined phases and amplitude ratio of effects due to both the superposition state preparation and subsequent applied fields. The functional form of Eq. (11) prevents analytic determination of conditions under which the yield in channel $q=2$ is an extremum. One interesting result emerges, however. Specifically if the molecule is such that $$|\mu_{1,2}^{(1)}|^2 = |\mu_{1,1}^{(1)}||\mu_{2,2}^{(1)}|$$

then tuning to the experimental parameter amplitude ratio $$x = |\mu_{1,2}^{(1)}|/|\mu_{2,2}^{(1)}|$$

and phase $$\cos(\theta_1 - \theta_2 + \alpha_{1,2}^{(1)}) = -1$$

yields all product in channel 2. Consideration of the definition of $\mu_{i,j}$ in conjunction with the Schwartz inequality shows that this condition obtains when the degenerate states $|E,\underline{n},q^-\rangle$ have only one n state at energy E for a given q. This is the case, for example, with diatomic molecule dissociation to two product channels. In cases where the matrix element condition is not satisfied, reducing (increasing) R(1:2;E) is possible although the zero minimum (unity maximum) may not be attainable.

SPECIFIC DESCRIPTION OF THE MOST PREFERRED EMBODIMENTS

The invention may be illustrated by the following specific example.

EXAMPLE 1

The molecule of methyl iodide, $CH_3I$, has two possible photodissociative pathways upon irradiation, thus:

$$CH_3I \xrightarrow{h\nu} (a)\ CH_3 + I\ \text{and}\ (b)\ CH_3 + I^*$$

where $h\nu$ represents radiation of sufficient energy to break the chemical bonds in the molecule, $CH_3$ represents the methyl free radical and $I^*$ represents an atom of iodine in an electronically excited state. By normal photodissociation processes according to the prior art, the product mixture resulting from adoption of path (a) or path (b) is uncontrollable, and at 266 nm=$\nu_1$, ~70% of the resulting iodine atoms are in the excited state $I^*$.

In the process of the present invention, the photo-dissociative molecule such as $CH_3I$ is raised to a superposition state at an energy level E which is above the maximum bound state energy level $E_B$ of the molecule, ie. in the continuum, where the molecule dissociates into its component parts. This raising to a superposition state at energy level E is done by use of coherent radiations of different but mutually related energy values, in separate stages.

Figure 3A:
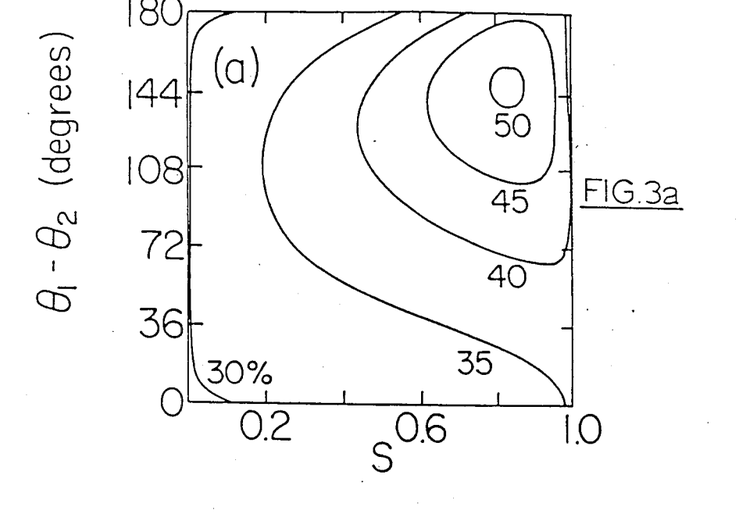
FIGS. 3a and 3b are contour plots illustrating the variations in the yields of photodissociation product I from $CH_3I$ from a linear superposition of bound states $\epsilon_1$ and $\epsilon_2$, and $\epsilon_1$ and $\epsilon_3$, respectively, as the relative phase and amplitude of the two simultaneously applied lasers is varied, as described in example 1 below.
Figure 3B:
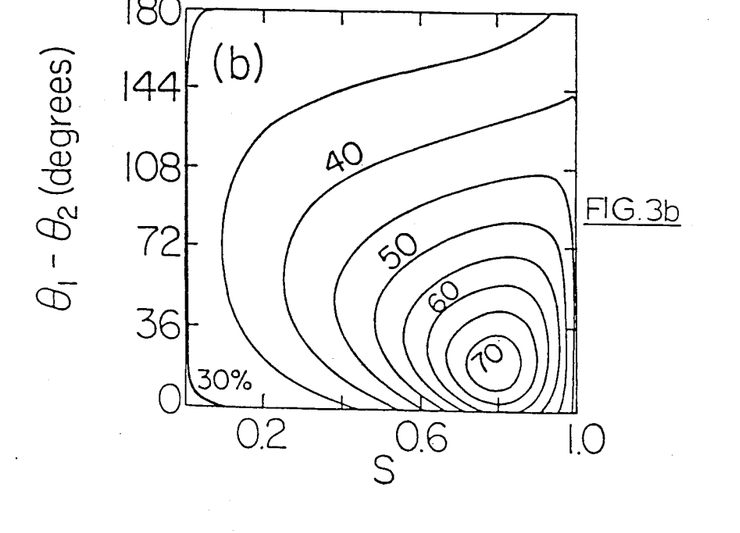

Dissociation of methyl iodide via direct photoexcitation through the $^3Q_0$ and $^1Q_1$ electronic states to form $I(^2P_{3/2})$, denoted I, or $I(^2P_{\frac{1}{2}})$, denoted $I^*$, has been the subject of many experimental and theoretical studies. A cut through the $CH_3I$ potential surfaces 2 is shown in FIG. 2. Also shown are two of the four bound states studied, $|\epsilon_1\rangle$ being the ground vibrational state, $|\epsilon_2\rangle$ and $|\epsilon_3\rangle$ corresponding to one and two quanta excitation in the C-I stretch and $|\epsilon_4\rangle$ having one quanta of excitation in the umbrella mode. Converged multichannel calculations previously performed[3] for $CH_3I$ were utilized, in conjunction with Eq. (10), to compute the yield $I/(I+I^*)$, at $E=w_1=37593.9\ cm^{-1}$ ($\lambda=266$ nm) for excitation from several different pairwise combinations of the four lowest bound states. In this case the $I^*$ channel is labeled q=1. FIG. 3 is a contour plot of the yield of I (ie. the percent of I as product) in the photodissociation of $CH_3I$ from a linear superposition of (a) $|\epsilon_1\rangle$ and $|\epsilon_2\rangle$; (b) $|\epsilon_1\rangle$ and $|\epsilon_3\rangle$. The abscissa is labelled by the relative amplitude parameter $S=|f_2|^2/|f_1|^2+|f_2|^2$ and FIG. 3 clearly demonstrates the broad range of control afforded over the I to $I^*$ product ratio. For example, FIG. 3b corresponding to excitation from a superposition of $|\epsilon_1\rangle$ plus $|\epsilon_3\rangle$ allows an increase of the yield of I from 30%, the value attained by excitation with one frequency, to ~70%. Less drastic yield changes are observed with some of the other linear combinations studied. Preliminary studies show that the extent of variation attainable correlates with the quantity $$[|\mu_{1,1}^{(1)}||\mu_{2,2}^{(1)}| - \{\mu_{1,2}^{(1)}\}^2]^{-1}.$$

In principle these matrix elements are available from Resonance Rayleigh and Raman scattering[3] on the same system.

Figure 4A:
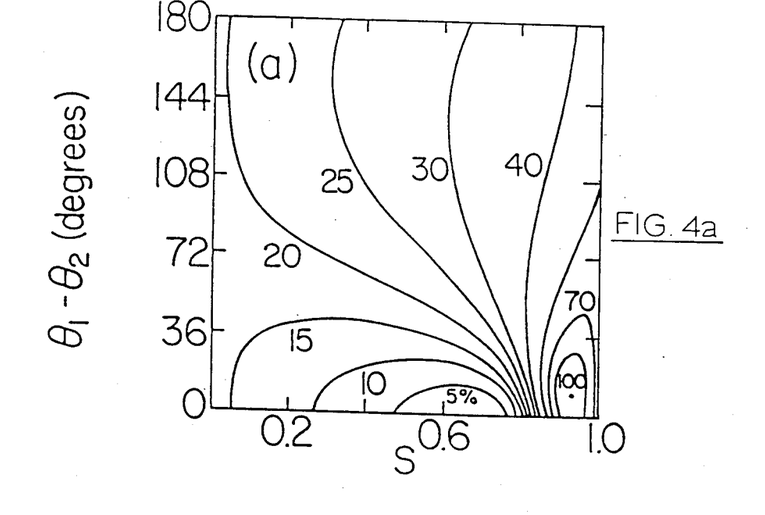
FIGS. 4a and 4b are similar contour plots relating to the yield of I from photodissociation of model FI, from example 1 below.
Figure 4B:
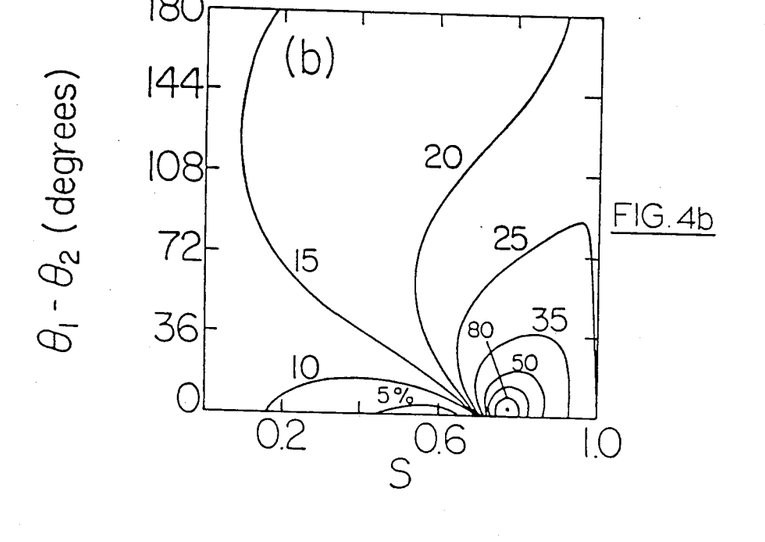

To demonstrate the maximum control afforded in the diatomic case we redid the $CH_3I$ computations including only the lowest vibrational state in the sum [Eq. (10)] defining In this way the $CH_3$ radical is essentially replaced by a single particle, equivalent in mass to F. This provides a diatomic model akin to FI. The results are shown in FIG. 4 for the same linear superposition states as in FIG. 3. FIG. 4 is a contour plot of the yield of I in the photodissociation of this model diatomic molecule FI from a linear superposition of (a) $|\epsilon_1\rangle$ and $|\epsilon_2\rangle$; and (b) $|\epsilon_1\rangle$ and $|\epsilon_3\rangle$; with axis labels as in FIG. 3. The ability to reduce the I yield to zero, or increase it fully to one, is clearly evident.

C. CONTROL OF QUANTUM STATE POPULATIONS

Our approach relies on the fact that a molecule, at an energy E where dissociation is possible, is described by a continuum of degenerate energy eigenstates $|E,\underline{n},q^-\rangle$. Here $|E,\underline{n},q^-\rangle$ denotes a state which correlates with the products in channel q (q=1,2 ... ) and internal product quantum numbers n. Control over the probability of a particular product quantum state is obtained by producing a linear combination of these energetically degenerate contunuum eigenstates. This can be accomplished experimentally by excitation, for example, from a coherent linear superposition of bound molecular eigenstates as described above.

Thus, consider a two step procedure where first, the molecule is prepared in a linear superposition $|\psi(t)\rangle = c_1|E_1\rangle + c_2|E_2\rangle$ of nondegenerate bound eigenstates $|E_m\rangle$ using an appropriate pulsed or CW laser. Second, the resultant superposition state is photodissociated with two lasers, at frequencies $w_{E1} = (E-E_1)/\hbar$ and $w_{E2}=(E-E_2)/\hbar$. The electric field amplitudes at these frequencies are denoted $\epsilon(w_{Ej}) = \bar{\epsilon}(w_{Ej})\exp(-i\phi w_{Ej})$. We define, for use later below, the experimentally controllable amplitudes $f_j$ and phases $\phi_j$ via $\bar{\epsilon}(w_{Ej})\ c_j = f_j \exp(i\ \theta_j)$.

Consider now the probability R(q,n;E) of observing a given product quantum state n in channel q at energy E. A direct extension of Section B gives $$R(q,n;E) = P(q,n;E) / \sum_{q,n} P(q,n;E) \quad (1)$$

$$P(q,n;E) = \{|\mu_{1,1}^{(q,n)}| + x^2|\mu_{2,2}^{(q,n)}| + 2x\cos(\theta_1 - \theta_2 + \alpha_{1,2})|\mu_{1,2}^{(q,n)}|\}$$

where $$\mu_{i,j}^{(q,n)} = |\mu_{i,j}^{(q,n)}|\exp(i\alpha_{i,j}^{(q,n)}) = \langle E_j|\mu|E_1\underline{n},q^-\rangle\langle E_1\underline{n},q^-|\mu|E_i\rangle E_2$$

Here $\mu$ is the dipole operator and x is the amplitude ratio $|f_2/f_1|$.

Experimentally altering $(\theta_1-\theta_2)$ and x, which include phase and amplitude effects due to both the superposition state preparation and subsequent applied fields, provides control over the probability of observing the (q,n) product state. For example, since $$|\mu_{1,2}^{(q,n)}|^2 = |\mu_{1,1}^{(q,n)}||\mu_{2,2}^{(q,n)}|$$

then tuning to $$x = |\mu_{1,2}^{(q,n)}|/|\mu_{2,2}^{(q,n)}|$$

and $\cos(\theta_1-\theta_2+\alpha_{1,2})=-1$ results in the elimination of all product in channel (q,n).

EXAMPLE 2

Figure 5A:
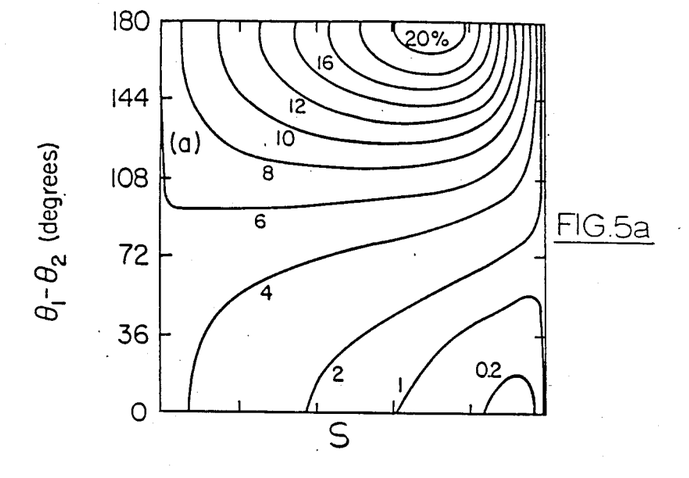
FIGS. 5a and 5b are also similar contour plots relating to the yield of a quantum state of the products in the photodissociation of $CH_3I$ from a linear superposition of $\epsilon_1$ and $\epsilon_2$, and $\epsilon_1$ and $\epsilon_3$, respectively.
Figure 5B:
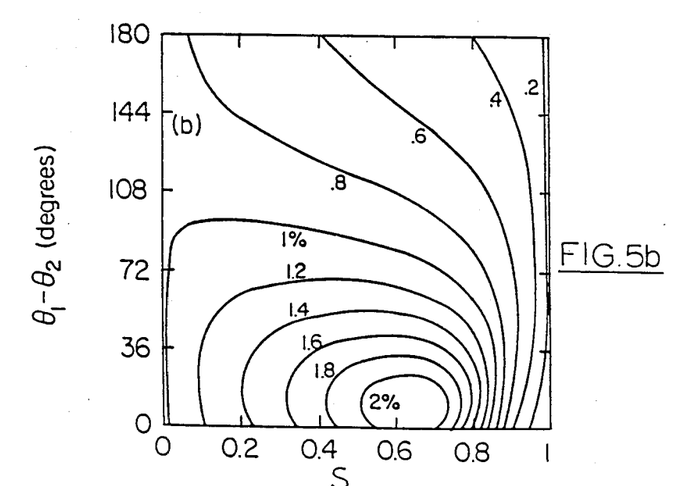

Consider $CH_3I$ photodissociation through the $^3Q_0$ and $^1Q_1$ electronic state to form $I(^2P_{3/2})$, denoted I, or $I(^2P_{\frac{1}{2}})$, denoted I* for which converged multichannel calculations are available[3]. As initial states we chose two superposition states, each being a linear combination of a pair of bound eigenstates selected from the ground, first and second excited C-I stretch states. FIG. 5 shows the yield of the (I,n=0) or (I*, n=0) quantum states, where n=0 denotes the ground vibrational state of the $CH_3$ radical, for excitation from two such superposition states, as a function of the amplitude parameter $S=|f_2|^2/(|f_1|^2+|f_2|^2)$, and phase difference $\theta_1-\theta_2$. The quantum state yield, in case (a), is seen to be controllable over a range of 0 to 20% whereas a 0 to 2% range is possible in case (b). The maximum yield in both cases, is substantially larger than the single laser configuration (S=0 or S=1).

In summary, in considering the use of lasers to control molecular pathways one may identify two alternative approaches, which can be termed passive and direct. In the former case one utilizes, for example, the high frequency resolution of the laser to probe difference frequency regimes and allows the frequency dependence of the natural branching ratio of the molecule to determine the product yields. Obtaining enhancement of the desired product is thus heavily determined by molecular properties. The same holds true for methods which use strong laser fields at a single frequency; they serve to complicate the dynamics but the effect of the laser cannot be foreseen. In the direct approach according to this invention, several lasers are used to override the natural tendency to branch in a fixed manner. This is done by controllably combining different states coherently, with different branching ratios, to enhance the desired product.

We claim:

1. A process of conducting photodissociation of molecules in a known energy level $E_I$, said molecules having a plurality of possible photodissociation pathways, comprising raising said molecules from said level $E_I$ to a predetermined energy level E in the continuum above the dissociation energy $E_B$ of the molecule along a plurality of different routes, each route requiring at least one frequency of phase coherent electromagnetic radiation, a frequency of phase coherent radiation pertaining to one such energy route being simultaneously applied with a frequency of phase coherent radiation pertaining to at least one other such route, the relative phase and the relative amplitude of the simultaneously applied frequencies of radiation being adjusted to control the degree to which respective photodissociation pathways are adopted.

2. The process of claim 1 wherein one of said independent energy routes comprises the application of coherent electromagnetic radiation of frequency $v_1$ to raise said molecules from said energy level $E_I$ to said predetermined energy level E and another of said independent energy routes comprises the application of coherent electromagnetic radiation of frequency $v_2$ to raise said molecules from an energy level $E_2$ to said predetermined energy level E.

3. The process of claim 2 wherein another of said independent routes comprises the application of coherent electromagnetic radiation of frequency $v_x$ to raise the molecules from energy level $E_I$ to a higher bound state energy level $E_X$ and the subsequent application of coherent electromagnetic radiation of a different frequency $v_1-v_x$ to raise the molecules from energy level $E_X$ to predetermined energy level E in the continuum, said application of radiation of frequency $v_1-v_x$ and said application of frequency $v_1$ occurring simultaneously.

4. The process of claim 2 wherein another of said independent energy routes is a simultaneous application of coherent electromagnetic radiation of a frequency of half that of frequency $v_1$.

5. The process of claim 2 wherein another of said independent energy routes comprises the application of coherent electromagnetic radiation of frequency $v_c$ to raise the molecules up to an unbound energy state $E_c$ above the predetermined energy level E in the continuum, and the application of coherent electromagnetic radiation of frequency $v_c-v_1$ to cause stimulated emmission of molecules in energy level $E_c$ to energy level E, said application of radiation of frequency $v_c-v_1$ and said application of frequency $v_1$ occurring simultaneously.

6. The process of claim 2 wherein the radiation freqeqncy $v_1$ is two times greater than the radiation frequency $v_2$.

7. The process of claim 1 wherein said coherent electromagnetic radiation is obtained using a laser.

8. The process of claim 7 wherein the laser irradiation is conducted under conditions in which intermolecular collisions are substantially eliminated on the time scale of the controlled photodissociation.

9. The process of claim 8 wherein the conditions include internal molecular modes at temperatures below 0° Celsius.

10. The process of claim 8 wherein said conditions include pressures sufficiently low to substantially eliminate intermolecular collisions.

11. The process of claim 1 including an initial step of reducing said molecules, prior to electromagnetic irradiation, predominantly to the ground energy state, either by cooling thereof, or by passage through a supersonic nozzle at high speed for adiabatic expansion.

12. The process of claim 1 wherein the molecules have a plurality of possible product quantum state populations, and wherein relative phase and relative amplitude of the simultaneously applied frequencies of radiation is adjusted to control said product quantum state populations.

13. The process of claim 12 wherein the resultant controlled product molecules are utilized to produce chemical laser emission.

14. The process of claim 12 wherein said coherent electromagnetic radiation is obtained using a laser.

15. The process of claim 14 wherein the laser irradiation is conducted under conditions in which intermolecular collisions are substantially eliminated on the time scale of the controlled photodissociation.

16. The process of claim 15 wherein the conditions include internal molecular modes at temperatures below 0° C.

17. The process of claim 15 wherein said conditions include pressures sufficiently low to substantially eliminate intermolecular collisions.

18. The process of claim 15 including an initial step of reducing said molecules, prior to laser irradition, predominantly to the ground state, either by cooling thereof or by passage through a supersonic nozzle at high speed for adiabatic expansion.

19. The process of claim 12 wherein the radiation frequency $v_1$ is two times greater than the radiation frequency $v_2$.

* * * * *

UNITED STATES PATENT AND TRADEMARK OFFICE
CERTIFICATE OF CORRECTION

PATENT NO. : 4,755,269

DATED : July 5, 1988

INVENTOR(S) : Paul Brumer et al.

It is certified that error appears in the above-identified patent and that said Letters Patent is hereby corrected as shown below:

Title page: line [73], change the Assignee to read:

--The Univ. of Toronto Innovations Foundation, Ontario, Canada, and Yeda Research and Development Company Limited, Rehovot, Israel--.

Signed and Sealed this

Second Day of October, 1990

Attest:

HARRY F. MANBECK, JR.

*Attesting Officer*  *Commissioner of Patents and Trademarks*